United States Patent
Tu et al.

(10) Patent No.: US 12,403,453 B2
(45) Date of Patent: Sep. 2, 2025

(54) STATIONARY PHASE MEDIUM FOR ADSORPTION CHROMATOGRAPHY AND MANUFACTURING METHOD THEREOF

(71) Applicant: Tantti Laboratory Inc., Taoyuan (TW)

(72) Inventors: Tsung-Han Tu, Taoyuan (TW); Chia-Wei Lin, Taoyuan (TW); Shih-Yu Wang, Taoyuan (TW); Hui Chen, Taoyuan (TW); Min-Shyan Sheu, Taoyuan (TW); Shih-Horng Yang, Taoyuan (TW)

(73) Assignee: Tantti Laboratory Inc., Taoyuan (TW)

( * ) Notice: Subject to any disclaimer, the term of this patent is extended or adjusted under 35 U.S.C. 154(b) by 734 days.

(21) Appl. No.: 17/729,153

(22) Filed: Apr. 26, 2022

(65) Prior Publication Data
US 2023/0338924 A1 Oct. 26, 2023

(30) Foreign Application Priority Data

Apr. 20, 2022 (TW) .................................. 111114908

(51) Int. Cl.
| | | |
|---|---|---|
| B01J 20/26 | (2006.01) | |
| B01D 15/20 | (2006.01) | |
| B01J 20/28 | (2006.01) | |
| B01J 20/285 | (2006.01) | |
| B01J 20/288 | (2006.01) | |
| B01J 20/30 | (2006.01) | |

(52) U.S. Cl.
CPC .......... *B01J 20/285* (2013.01); *B01D 15/206* (2013.01); *B01J 20/267* (2013.01); *B01J 20/28004* (2013.01); *B01J 20/28016* (2013.01); *B01J 20/28052* (2013.01); *B01J 20/28085* (2013.01); *B01J 20/28095* (2013.01); *B01J 20/288* (2013.01); *B01J 20/3021* (2013.01); *B01J 20/3085* (2013.01); *B01J 2220/54* (2013.01)

(58) Field of Classification Search
CPC .. B01J 20/285; B01J 20/267; B01J 20/28004; B01J 20/28016; B01J 20/28052; B01J 20/28085; B01J 20/28095; B01J 20/288; B01J 20/3021; B01J 20/3085; B01D 15/206
See application file for complete search history.

(56) References Cited

U.S. PATENT DOCUMENTS

| | | |
|---|---|---|
| 5,228,989 A | 7/1993 | Afeyan et al. |
| 6,414,043 B1 | 7/2002 | Asher et al. |
| 7,026,364 B2 | 4/2006 | Inoue et al. |
| 11,118,024 B2 | 9/2021 | Liao et al. |
| 11,236,184 B1 | 2/2022 | Wang et al. |
| 2002/0032246 A1 | 3/2002 | Asher et al. |
| 2008/0090995 A1* | 4/2008 | Andersson ........... B01J 20/3265 530/417 |
| 2017/0145051 A1* | 5/2017 | Momiyama .......... C07K 14/195 |
| 2019/0077936 A1* | 3/2019 | Liao ................... B01J 20/28085 |
| 2019/0105633 A1* | 4/2019 | Tamaki .................. A61L 15/60 |

FOREIGN PATENT DOCUMENTS

| | | |
|---|---|---|
| CN | 101119797 A | 2/2008 |
| JP | 2016-70937 A | 5/2016 |
| JP | 2016-538128 A | 12/2016 |
| JP | 2017-37070 A | 2/2017 |
| JP | 2017-512132 A | 5/2017 |
| JP | 7049021 B1 | 4/2022 |
| TW | 201934626 A | 9/2019 |

OTHER PUBLICATIONS

Japanese Office Action mailed Dec. 14, 2023 for Japanese Patent Application 2023-057718, 4 pages.
Search Report for Application No. 111114908 mailed on Jul. 4, 2022.
Bing Yu et al. "The Effect of Different Porogens on Porous PMMA Microspheres by Seed Swelling Polymerization and Its Application in High-Performance Liquid Chromatography Materials" 11(5), 705 MDPI 2018 1-11.
Yu-Fen Tseng et al., "A fast and efficient purification platform for cell-based influenza viruses by flow-through chromatography" Vaccine 36 (2018) 3146-3152.

* cited by examiner

*Primary Examiner* — Yong L Chu
(74) *Attorney, Agent, or Firm* — KDW Firm PLLC

(57) ABSTRACT

The invention relates to a stationary phase medium for adsorption chromatography, which is in form of porous particles suitable for being packed into a chromatographic column. The porous particles are made of cross-linked polymeric material and formed with interconnected macropores to constitute a porous network, through which a mobile phase fluid may flow in a convective manner. The porous particles are substantially free of diffusive pores and, thus, the mass transfer through the porous network is governed by convection alone. The porous particles are fabricated to have irregular granular configurations with rough outer surfaces, so that the convective flow between the porous particles will not be impeded during chromatography process.

15 Claims, 12 Drawing Sheets

STATIONARY PHASE MEDIUM FOR ADSORPTION CHROMATOGRAPHY AND MANUFACTURING METHOD THEREOF

CROSS REFERENCE TO RELATED APPLICATION

This application claims priority to R.O.C. Patent Application No. 111,114,908 filed Apr. 20, 2022, which is hereby incorporated by reference in their entirety.

BACKGROUND OF THE INVENTION

Field of the Invention

The present invention relates to a stationary phase medium for adsorption chromatography and, more particularly, relates to a stationary phase medium fabricated in form of polymeric porous particles which is adapted for being packed into a chromatographic column for separating macromolecules with high throughput, with high efficiency and with low back pressure.

Description of Related Art

Adsorption chromatography is a type of liquid chromatography for separation of a component in a mixture by selective adsorption from a mobile phase onto a solid stationary phase. Porous resin beads have been widely used as the stationary phase for adsorption chromatography. Typical resin beads are formed with a network of tortuous micropores having diameters from several to tens of nanometers, thus allowing low molecular weight solutes present in the mobile phase to diffuse in and out of the micropores. As shown in FIG. 1, the micropores normally reside near the outer surfaces of the resin beads and are not interconnected. Most of the adsorbing surfaces are internal to the resin beads and can only be reached via diffusion. While being proved to be very useful in separating small molecules, the conventional resin beads are shown to perform poorly for separation of macromolecules, as small sizes of the micropores exclude the entry of large molecules. That is to say, macromolecules can only bind as thin layers on the surfaces of the resin beads, consequently resulting in a low binding capacity. The slow separation speeds are particularly harmful to the biomolecules that are sensitive to enzymatic degradation or other damaging conditions. The resin-based chromatography has additional drawbacks of decrease in the resolution with increase in flow rate because intra-bead diffusion is the rate limiting step in the adsorption process and high pressure drop across the chromatographic column due to the limited convective flow between the resin beads. All of these drawbacks result in reduced separation efficiency and unsatisfactory productivity of desired macromolecules. Generally, chromatographic processes which use the conventional resin beads as stational phase media need days to complete and, thus, are extremely time-consuming and cost-ineffective.

Efforts have been made in the art to address the drawbacks. U.S. Pat. No. 5,228,989 proposed the so-called perfusion chromatographic resins which contain macropores with a diameter of 0.6-0.8 μm for convective mass transport and diffusive micropores to provide adsorption capacity. However, the involvement of diffusive transport in and out of the perfusion resin beads during the adsorption process would still slow down the overall throughput rate. Moreover, the perfusion resin beads are normally fabricated in form of spherical particles with a narrow size distribution. When the beads are packed closely together within a column for use in, for example, high performance liquid chromatography, the convective flow channels in-between the resin beads would be very narrow, and this in turn leads to a high back pressure.

In contrast to the resin beads which are fabricated in fine particulate form, block-shaped porous monoliths have been disclosed in, for example, U.S. Pat. Nos. 7,026,364, 11,118,024 and 11,236,184, as stationary phase media for adsorption chromatography. Taking advantage of their fast mass transfer capability, which is mainly attributed to the convective macropores formed therein, these porous monoliths are suitable for use as matrices for separating macromolecules. These porous monoliths may be produced by way of conventional processes, such as high internal phase emulsion templating and colloidal crystal templating. The former technology involves preparation of a water-in-oil emulsion followed by polymerization of the monomer-containing external phase and removal of the internal phase, whereas the latter includes infiltrating monomers into void spaces of a colloidal crystal template, polymerizing the monomers into a polymeric matrix and then removing the template. However, manufacturing a defect-free polymeric monolith can be a difficult task, as it tends to crack due to uneven thermal expansions during polymerization. A monolithic column with multiple defects would cause loss of resolution and reduce the recovery of target substances.

Therefore, there is still a need in the art for a stationary phase medium which is not only fabricated in form of polymeric porous particles suitable for being packed into a chromatographic column with low back pressure, but are also mainly constituted by convective macropores and substantially free of diffusive micropores to enable better access of macromolecules to the inner of the particles and allow convective mass transfer through the particles.

SUMMARY OF THE INVENTION

In order to overcome the drawbacks described above, the invention provides a stationary phase medium for adsorption chromatography, which is in form of a population of porous particles suitable for being packed into a chromatographic column. The respective porous particles are made of cross-linked polymeric material and formed with interconnected macropores to constitute a porous network, through which a mobile phase fluid may flow in a convective manner. Because the porous particles herein are substantially free of diffusive pores, the solutes or analytes carrying by the mobile phase fluid are transported through the porous network by convection alone. The porous network has a diameter, which is sufficiently large to allow convective flow of the mobile phase fluid, and an extremely large specific surface area to provide adsorbing surfaces where the macromolecules can easily approach and adhere. It is more important to note that the porous particles herein are fabricated to have irregular granular configurations with rough outer surfaces, so that the convective flow between the porous particles herein will not be impeded and slowed down during the separation process, in contrast to that occurring in conventional resin beads which are in form of uniform spheres.

Therefore, in the first aspect provided herein is a stationary phase medium for adsorption chromatography, which is particularly suitable for separation of macromolecules. The stationary phase medium comprises:
  a plurality of porous particles made of cross-linked polymeric material with a Feret diameter ranging from 25

μm to 500 μm and having a porosity ranging from 70% to 90%, each being formed with multiple spherical macropores having a diameter ranging from 3 μm to 10 μm, wherein the spherical macropores are interconnected with one another via connecting pores to constitute a porous network with an average diameter ranging from 0.2 μm to 6 μm; and wherein the porous particles are in form of irregular granules having a Feret aspect ratio distribution between 1.0 and 3.5 with a standard deviation ranging from 1.2 to 2.2.

In the second aspect provided herein is a method for producing the stationary phase medium above, which comprises the steps of:

A. preparing a porous monolith of cross-linked polymeric material having a porosity ranging from 70% to 90%, wherein the porous monolith is formed with multiple spherical macropores having a diameter ranging from 3 μm to 10 μm, and the spherical macropores are interconnected with one another via connecting pores to constitute a porous network with an average diameter ranging from 0.2 μm to 6 μm;

B. subjecting the porous monolith to mechanical grinding, such that the porous monolith is ground into a first population of porous particles having a particle size distribution of below 1,000 μm; and C. size-sorting the first population of porous particles to obtain a second population of porous particles with a Feret diameter ranging from 25 μm to 500 μm, wherein the second population of porous particles are in form of irregular granules having a Feret aspect ratio distribution between 1.0 and 3.5 with a standard deviation ranging from 1.2 to 2.2.

In a preferred embodiment, the porous particles are substantially free of micropores with a diameter less than 100 nm, as measured by mercury intrusion porosimetry.

In a preferred embodiment, the porous network has an average diameter ranging from 0.5 μm to 3.0 μm. In a more preferred embodiment, the porous network has an average diameter ranging from 1.2 μm to 2.4 μm.

In a preferred embodiment, the stationary phase medium is surface modified with ion exchange functionality. In a more preferred embodiment, the ion exchange functionality is selected from the group consisting of a quaternary amine, diethylaminoethyl, sulfonyl and carboxymethyl.

In preferred embodiments, the cross-liked polymeric material is selected from the group consisting of polyacrylates, polymethacrylates, polyacrylamides, polystyrenes, polypyrroles, polyethylenes, polypropylenes, polyvinyl chloride and silicones. In more preferred embodiments, the cross-liked polymeric material is selected from polymethacrylates.

In a preferred embodiment, at least 70% of the spherical macropores in the respective porous particles are in a close-packing arrangement.

Furthermore, in comparison to the stationary phase media produced by conventional processes, the stationary phase medium produced by the method above has structural features of an interior porous network formed during the preparation of the porous monolith, as well as irregular configurations and rough outer surfaces, which are imparted by the mechanical grinding step. Therefore, in the third aspect provided herein is a stationary phase medium produced by the method above.

In the fourth aspect provided herein is a chromatographic column which comprises a hollow elongated tube packed with the stationary phase medium described above.

BRIEF DESCRIPTION OF THE DRAWINGS

The above and other objects, features and effects of the invention will become apparent with reference to the following description of the preferred embodiments taken in conjunction with the accompanying drawings, in which.

DETAILED DESCRIPTION OF THE PREFERRED EMBODIMENTS

Unless specified otherwise, the following terms as used in the specification and appended claims are given the following definitions. It should be noted that the indefinite article "a" or "an" as used in the specification and claims is intended to mean one or more than one, such as "at least one," "at least two," or "at least three," and does not merely refer to a singular one. In addition, the terms "comprising/comprises," "including/includes" and "having/has" as used in the claims are open languages and do not exclude unrecited elements. The term "or" generally covers "and/or", unless otherwise specified. The terms "about" and "substantially" used throughout the specification and appended claims are used to describe and account for small fluctuations or slight changes that do not materially affect the nature of the invention.

Figure 1:
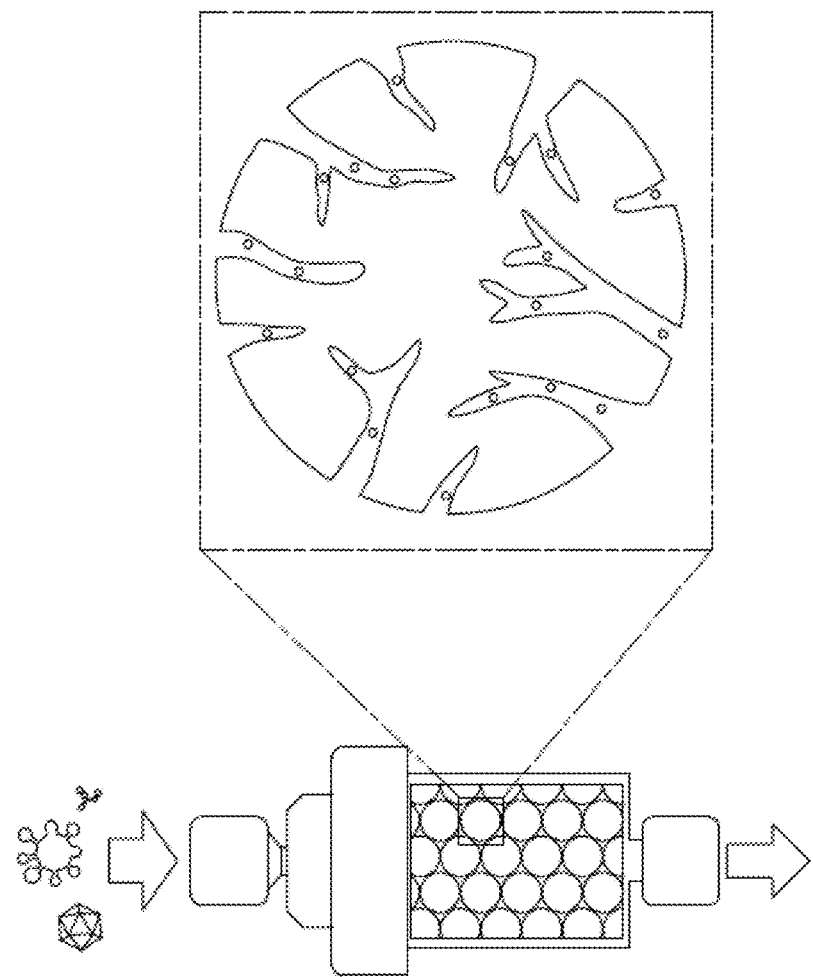
FIG. 1 is a schematic view of a resin bead known in the art.
Figure 2:
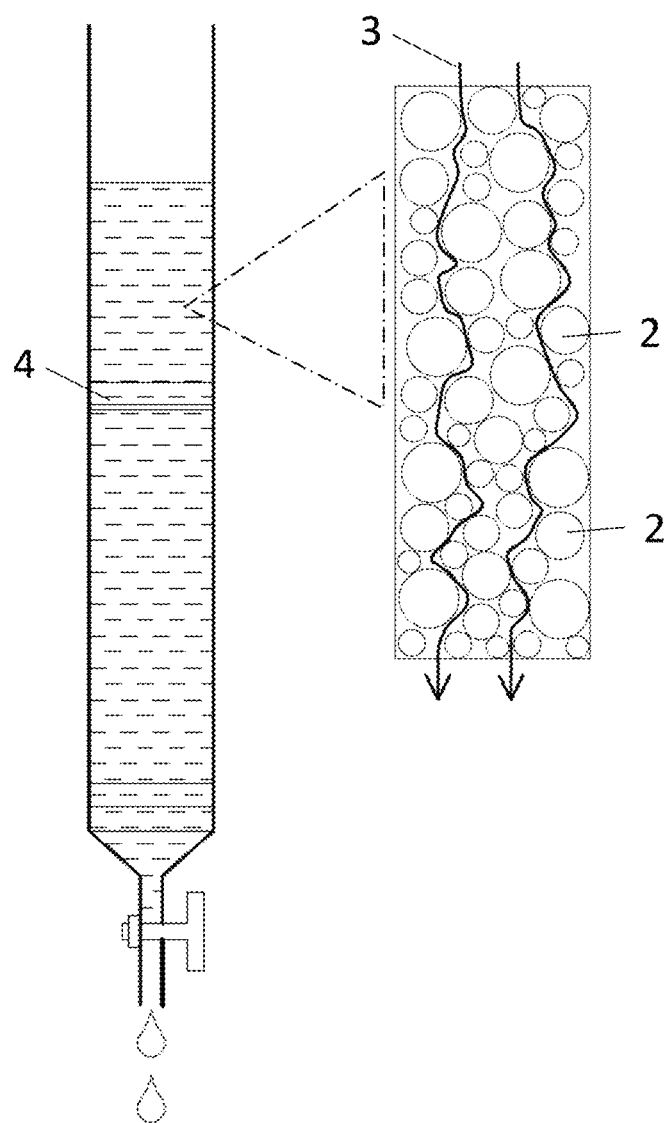
FIG. 2 is a schematic view of the implementation of an adsorption chromatography process according to the invention.
Figure 3:
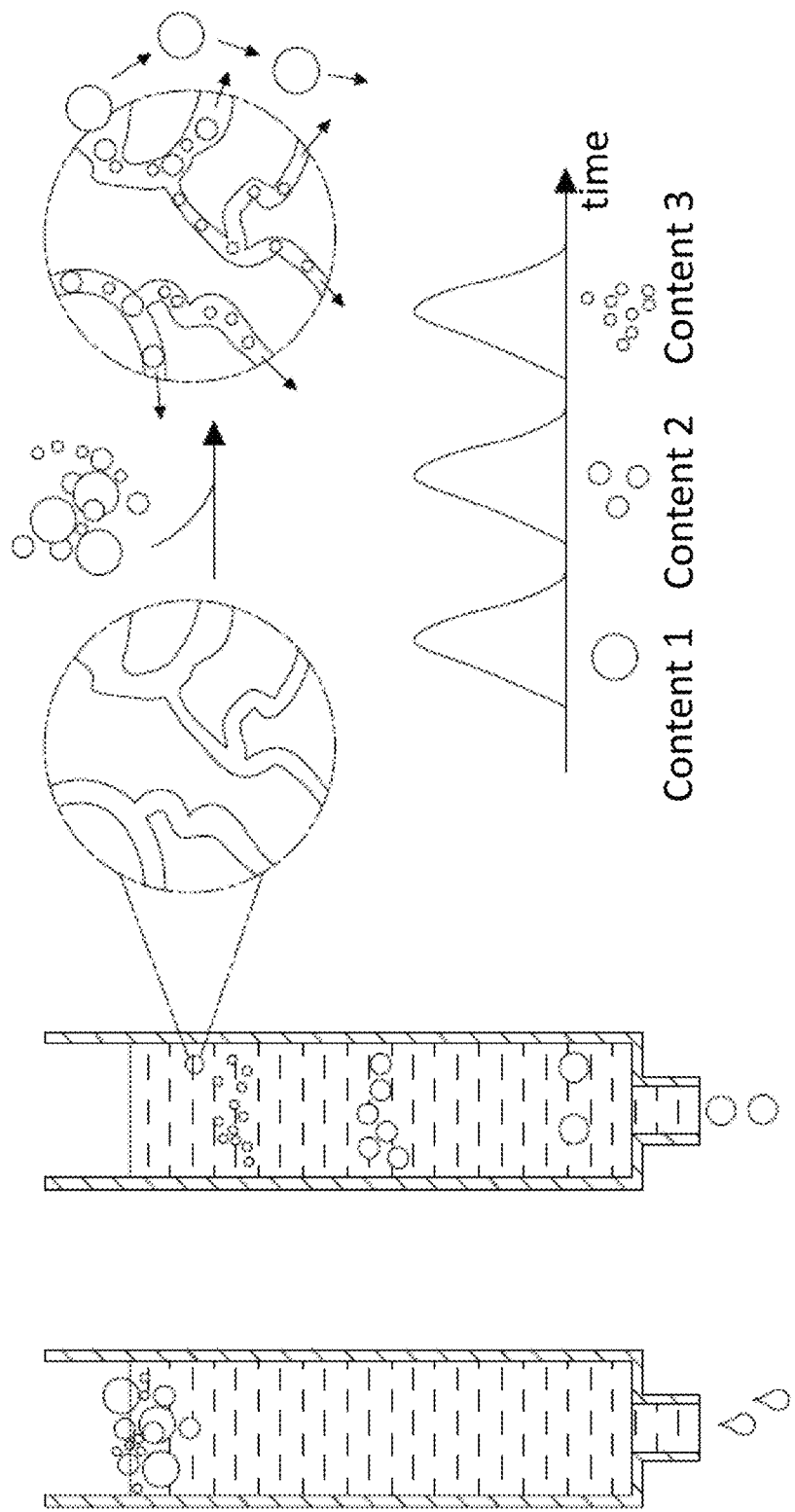
FIG. 3 is a schematic diagram showing that macromolecules with different adsorptive characteristics leave the column at different times.

FIGS. 2 and 3 show the implementation of an adsorption chromatography process according to the invention, in which a stationary phase 2 in the solid state and a mobile phase 3 in the liquid state are used to separate a variety of macromolecules 4 in light of their adsorptive interaction with the stationary phase 2. The adsorption chromatography may be of the type known in the art, which includes, but is not limited to, ion-exchange chromatography, hydrophobic interaction chromatography, affinity chromatography and reversed-phase chromatography. The term "stationary phase" as used herein may refer to an immobilized solid phase carrier through which the mobile phase 3 is allowed to flow through during the chromatography process, such that the macromolecules 4 may be retained by the stationary phase 2. Herein, the stationary phase 2 comprises a population of porous particles packed within a chromatographic column. The term "stationary phase medium" as used herein intends to encompass the population of porous particles in their packed or unpacked state. As shown in FIG. 2, the mobile phase 3 is applied to the top of the column and allowed to flow downwards to the bottom of the column. As shown in FIG. 3, the macromolecules 4 that are more attracted to the stationary phase 2 are retained in the column for a longer time, whereas the macromolecules 4 that are less attracted to the stationary phase 2 tend to leave the column faster. As a result, macromolecules 4 with different adsorptive characteristics can be harvested separately. The adsorption chromatography herein may be carried out in either a bind-and-elute mode, in which target macromolecules are retained on the stationary phase medium and subsequently eluted with a proper eluent, or a flow-through mode where the unwanted molecules and impurities are adsorbed by the stationary phase medium to allow the target macromolecules to flow through.

FIGS. 4B-4F and 5 show the porous particles according to the invention. It can be seen clearly that the respective porous particles are formed with multiple spherical macropores stacked one another, as indicated by the solid circle in FIG. 5. These macropores are interconnected and in fluid communication with one another via connecting pores which are indicated by the dotted circle in FIG. 5. As measured through electron microscopy, the porous particles are of a Feret diameter ranging from 25 μm to 500 μm, preferably from 25 μm to 300 μm, such as from 25 μm to 100 μm, with the spherical macropores having a diameter ranging from 3 μm to 10 μm. The term "Feret diameter" as used herein refers to the maximum distance between the farthest two points on the outer profile of a given particle. In the respective porous particles, the interconnected macropores constitute with the connecting pores connected thereto a continuous porous network which has an average diameter ranging from 0.2 μm to 6.0 μm, preferably from 0.5 μm to 3.0 μm, such as from 1.2 μm to 2.4 μm, as measured by capillary flow porometry. As stated below, the particle sizes of the porous particles, as well as the diameters of the macropores and porous network, can be adjusted by controlling the parameters and conditions of the process for producing the porous particles.

Figure 6:
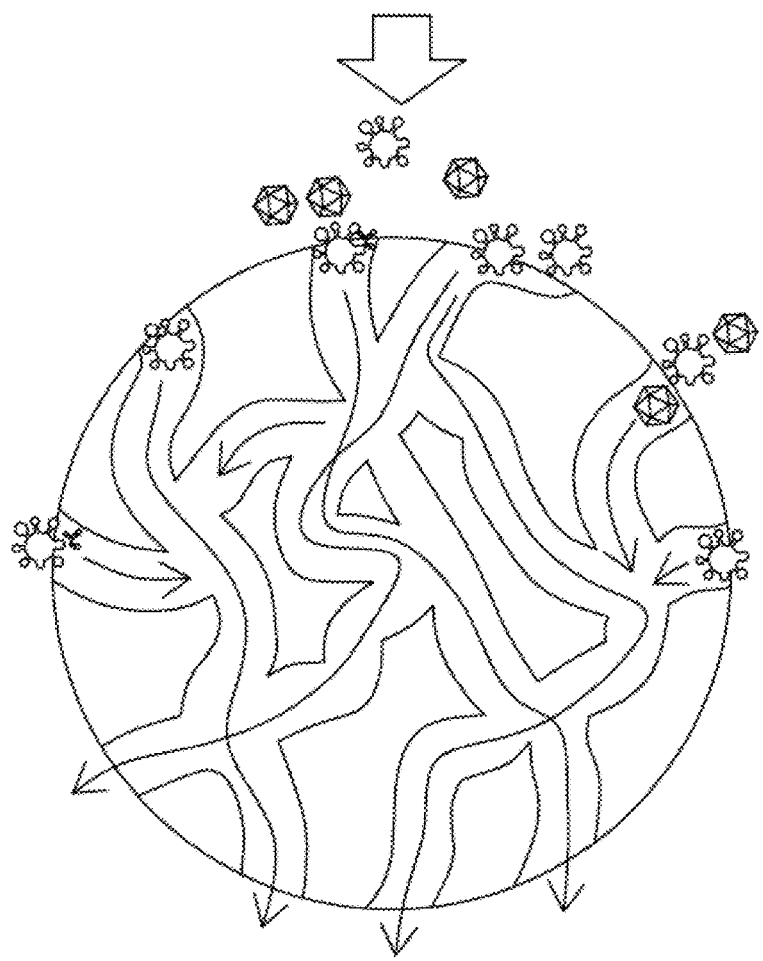
FIG. 6 is a schematic diagram showing the mass transfer through the porous particle according to one embodiment of the invention.

According to the measurement through electron microscopy and capillary flow porometry above, the porous networks formed in the respective porous particles are sufficiently large to allow convective flow of the mobile phase fluid therethrough. The porous particles are also substantially free of diffusive pores, which means herein that more than 90%, preferably more than 95%, more preferably more than 98%, such as more than 99%, of the porous particles in their entirely, and therefore of the porous networks formed therein, are substantially free of micropores with diameters less than 100 nm as measured by mercury intrusion porosimetry. As an advantageous result, the mass transfer through the porous networks is carried out exclusively by convection, as stated below in Example 5 and shown in FIG. 9. As further shown by the SEM images in FIGS. 4B-4F and the schematic diagram in FIG. 6, the porous network is open to the ambient and further provides an extremely large specific surface area, where macromolecules can easily approach and be retained. Taking advantage of these structural characteristics, the stationary phase medium disclosed herein allows the mobile phase to flow therethrough at high speed while providing high adsorption capacity for macromolecules.

The particles disclosed herein are highly porous and the macropores are distributed evenly in the respective particles, thus ensuring high mass transfer and low back pressure during the separation process. The porosity of a porous particle is defined herein as a percentage of the pore volume relative to the total volume of the particle, which may be calculated with the following formula:

$$1-[(\text{weight of the porous body/density of the continuous phase})/\text{apparent volume of the porous body}]$$

Alternatively, porosity may be determined by taking cross-sectional images of the porous particles using a scanning electron microscope, and then calculating the porosity using ImageJ software (National Institutes of Health, Bethesda, Maryland, USA). In one embodiment, the particles have a porosity ranging from about 70% to about 90%, preferably from 74% to 90%.

As further shown in FIGS. 4B-4F, the porous particles herein are fabricated in form of irregular granules with rough outer surfaces. The term "irregular" as used herein refers to the porous particles that depart from spherical shape to a certain extent. According to the invention, the extent of irregularity is expressed by Feret aspect ratio, which is calculated as the quotient of the major and minor axes of a given porous particle. The calculated value would normally be greater than 1, given that a perfect sphere yields a Feret aspect ratio of 1. Particle image analysis was conducted for calculation of particle irregularity, and the porous particles herein are shown to have a Feret aspect ratio distribution between 1.0 and 3.5 with a standard deviation ranging from 1.2 to 2.2. As stated below, the irregular configurations of the porous particles may be achieved as a result of mechanical grinding of a porous monolith into particles, and a number of advantages will be brought about thereby. First, the porous particles with irregular configurations have greater surface areas and therefore a greater adsorption capacity, as compared with both their monolithic counterparts and spherical analogs. Second, it is intuitive that the irregular particles herein have rough outer surfaces and, therefore, tend to interlock with one another when packed into a chromatographic column, resulting in a packed bed with high mechanical strength which is capable to withstand the back pressure occurring during the separation process. Third, the convective flow channels between the irregular particles in the packed bed are much broader as compared with their spherical counterparts in packed state. As such, the convective flow between the irregular particles herein will not be impeded and slowed down during the separation process. In some embodiments, the interstitial channels formed among particles have an average diameter ranging from 2 μm to 110 μm.

The porous particles herein are made of cross-linked polymeric material. The polymeric material useful in the invention is known in the related art, which include, but are not limited to, polyacrylates, polymethacrylates, polyacrylamides, polystyrenes, polypyrroles, polyethylenes, polypropylenes, polyvinyl chloride and silicones. In a preferred embodiment, the porous particles are made of polymethacrylates.

By virtue of its fast kinetics, high porosity, good mechanical property and low back pressure, the stationary phase medium herein is useful for separating macromolecules with large molecular sizes, including those with a hydrodynamic radius of more than 10 nm, preferably more than 50 nm, which include, but are not limited to, proteins, nucleic acids, viroids, viruses, viral vectors, virus-like particles (VLPs), extracellular vesicles (EVs) and liposomes.

The invention further contemplates a chromatographic column packed with the stationary phase medium herein. The chromatographic column comprises a hollow elongated tube for accommodating the packed bed. Suitable material and shape for the hollow elongated tube is known in the art of chromatography. In one embodiment, the tube is made of material selected from the group consisting of stainless steel, titan, quartz, glass and rigid plastics, such as polypropylene, and configured in form of a cylindrical, rectangular or polygonal tube.

In some embodiments, the stationary phase medium is chemically modified to include functionalities or ligands for adsorption of macromolecules. For example, in the embodiment where the stationary phase medium is used as an ion exchanger, the porous particles, including the porous networks formed therein, are surface modified with ion exchange functional groups, such as quaternary amine as a strong anion exchanger, diethylaminoethyl (DEAE) as a weak anion exchanger, sulfonyl as a strong cation exchanger and carboxymethyl as a weak cation exchanger.

Figure 7:
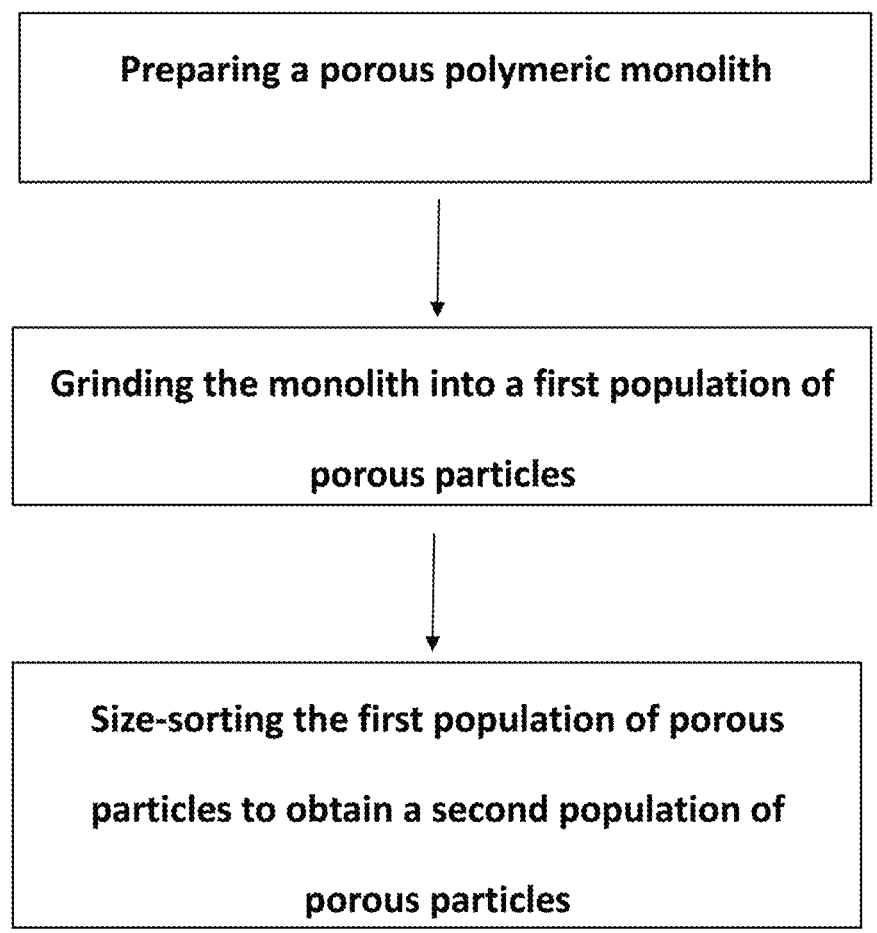
FIG. 7 shows the flowchart of the method for producing the porous particles according to one embodiment of the invention.

FIG. 7 shows the flow chart of the method for producing the stationary phase medium according to the invention, which comprises Step A: preparing a porous polymeric monolith; Step B: grinding the monolith into a first population of porous particles; and Step C: size-sorting the first population of porous particles to obtain a second population of porous particles with a Feret diameter of 25-500 µm.

Step A involves preparing a porous polymeric monolith which has the same porous characteristics as the porous particles described above. That is to say, the porous monolith is made of cross-linked polymeric material, has a porosity ranging from 70% to 90%, and is formed with multiple spherical macropores having a diameter ranging from 3 µm to 10 µm. The spherical macropores are interconnected with one another via connecting pores to constitute a porous network with an average diameter ranging from 0.2 µm to 6.0 µm, preferably from 0.5 µm to 3.0 µm, such as from 1.2 µm to 2.4 µm.

The term "monolith" refers to a solid, porous three-dimensional structure which is not particulate in nature. Suitable processes for preparing a porous polymeric monolith are known in the art.

In one preferred embodiment, Step A is carried out using high internal phase emulsion templating. A general protocol of high internal phase emulsion templating involve preparing a high internal phase emulsion (HIPE), in which an internal phase (namely, a dispersed phase) of emulsified droplets with a volume fraction of over 74.05% are dispersed in an external phase (namely, a continuous phase), followed by polymerizing the monomer-containing external phase and then removing the internal phase template.

A practicable procedure can be seen in, for example, U.S. Pat. No. 11,236,184 assigned to the present Applicant, which comprises vigorously agitating a continuous phase composition and an immiscible dispersed phase composition by a high-speed homogenizer, so that the dispersed phase is evenly dispersed in the continuous phase to obtain a water-in-oil emulsion. Optionally, the water-in-oil emulsion may be subjected to a forced sedimentation, thereby increasing the volume fraction of the dispersed phase relative to the continuous phase in the emulsion to obtain a HIPE. Herein, the continuous phase is usually the one in which polymerization occurs and may comprise at least one monomer, a crosslinking agent, and optionally an initiator and an emulsion stabilizer, whereas the dispersed phase may comprise a solvent and an electrolyte.

The at least one monomer is meant to encompass any monomers and oligomers that are capable of forming a polymer through polymerization. In one preferred embodiment, the at least one monomer comprises at least one ethylenically unsaturated monomer or acetylenically unsaturated monomer suitable for free radical polymerization, namely, organic monomers with carbon-to-carbon double bonds or triple bonds, which include but are not limited to acrylic acids and the esters thereof, such as hydroxyethyl acrylate; methacrylic acids and the esters thereof, such as glycerol methacrylate (GMA), hydroxyethyl methacrylate (HEMA), methyl methacrylate (MMA); acrylamides; methacrylamides; styrene and its derivatives, such as chloromethylstyrene, divinylbenzene (DVB), styrene sulfonate; silanes, such as dichlorodimethylsilane; pyrroles; vinyl pyridine; and combinations thereof.

The term "crosslinking agent" as used therein may refer to a reagent that chemically bridges the polymer chains formed by polymerization of the at least one monomer. In one preferred embodiment, the "crosslinking agent" is a crosslinking monomer which can be dissolved along with the at least one monomer in the continuous phase and usually has multiple functional groups to enable the formation of covalent bonds between the polymer chains of the at least one monomer. Suitable crosslinking agents are well known in the art and can be selected depending upon the type of the at least one monomer, which include but are not limited to oil-soluble crosslinking agents, such as ethylene glycol dimethacrylate (EGDMA), polyethylene glycol dimethacrylate (PEGDMA), ethylene glycol diacrylate (EGDA), triethylene glycol diacrylate (TriEGDA), divinylbenzene (DVB); and water-soluble crosslinking agents, such as N,N-diallylacrylamide, N,N'-methylenebisacrylamide (MBAA). As known to those having ordinary skill in the art, the amount of the crosslinking agent used is positively correlated to the mechanical strength of the porous monolith produced, that is, the higher the degree of crosslinking, the higher the mechanical strength of the porous monolith. Preferably, the crosslinking agent is present in an amount about 5 to 50% by weight, such as in an amount about 5 to 25% by weight, of the continuous phase.

The term "emulsion stabilizer" as used herein may refer to a surface-active agent suitable for stabilizing a HIPE and preventing the droplet units of the dispersed phase from coalescence. The emulsion stabilizer can be added to the continuous phase composition or the dispersed phase composition prior to preparing the emulsion. The emulsion stabilizer suitable for use herein may be a nonionic surfactant, or an anionic or a cationic surfactant. In the embodiment where the high internal phase emulsion is a water-in-oil emulsion, the emulsion stabilizer preferably has a hydrophilic-lipophilic balance (HLB) of 3 to 14, and more preferably has a HLB of 4 to 6. In preferred embodiments, a non-ionic surfactant is used herein as the emulsion stabilizer, and the useful types thereof include, but are not limited to polyoxyethylated alkylphenols, polyoxyethylated alkanols, polyoxyethylated polypropylene glycols, polyoxyethylated mercaptans, long-chain carboxylic acid esters, alkanolamine condensates, quaternary acetylenic glycols, polyoxyethylene polysiloxanes, N-alkylpyrrolidones, fluorocarbon liquids and alkyl polyglycosides. Specific examples of the emulsion stabilizer include, but are not limited to sorbitan monolaurate (trade name Span®20), sorbitan tristearate (trade name Span®65), sorbitan monooleate (trade name Span®80), glycerol monooleate, polyethylene glycol 200 dioleate, polyoxyethylene-polyoxypropylene block copolymers (such as Pluronic® F-68, Pluronic® F-127, Pluronic® L-121, Pluronic® P-123), castor oil, mono-ricinoleic acid glyceride, distearyl dimethyl ammonium chloride, and dioleyl dimethyl ammonium chloride.

The term "initiator" may refer to a reagent capable of initiating polymerization and/or crosslinking reaction of the at least one monomer and/or the crosslinking agent. Preferably, the initiator used herein is a thermal initiator which is an initiator capable of initiating the polymerization and/or crosslinking reaction upon receiving heat. The initiator can be added to the continuous phase composition or the dispersed phase composition before preparing the HIPE. According to the invention, the initiators which may be added to the continuous phase composition include, but are not limited to azobisisobutyronitrile (AIBN), azobisisoheptonitrile (ABVN), azobisisovaleronitrile, 2,2-bis [4,4-bis (tert-butylperoxy)cyclohexyl]propane, benzyl peroxide (BPO) and lauroyl peroxide (LPO), whereas the initiators which may be added to the dispersed phase composition include, but are not limited to persulfates, such as ammonium persulfate and potassium persulfate. The HIPE herein may further include a photoinitiator which can be activated by ultraviolet light or visible light to initiate the polymerization and/or crosslinking reaction and, alternatively, a suitable photoinitiator may be used to replace the thermal initiator.

The dispersed phase mainly includes a solvent. The solvent can be any liquid that is immiscible with the continuous phase. In the embodiment where the continuous phase is highly hydrophobic, the solvent may include, but be not limited to water, fluorocarbon liquids and other organic solvents that are immiscible with the continuous phase. Preferably, the solvent is water. In this embodiment, the dispersed phase may further include an electrolyte which can substantially dissociate free ions in the solvent and includes salts, acids, and bases that are soluble in the solvent. Preferably, the electrolyte may be an alkali metal sulfate, such as potassium sulfate, or an alkali metal or alkaline-earth metal chloride salt, such as sodium chloride, calcium chloride, and magnesium chloride.

The HIPE may be added with a polymerization promoter. The term "promoter" may refer to a reagent capable of accelerating polymerization and/or crosslinking reaction of the at least one monomer and/or the crosslinking agent. Typical examples of the promoter include, but are not limited to, N,N,N',N'-tetramethylethylenediamine (TEMED), N,N,N',N'',N''-pentamethyl diethylene triamine (PMDTA), tris(2-dimethylamino)ethylamine, 1,1,4,7,10,10-hexamethyltriethylenetetramine, 1,4,8,11-tetramethyl-1,4,8,11-tetraazacyclotetradecane, which can promote the initiator, such as ammonium persulfate, to decompose into free radicals, thereby accelerating the polymerization and/or crosslinking reaction. Preferably, the promoter may be added in an amount of 10-100 mole % with respect to the added amount of the initiator.

The HIPE thus prepared is subjected to heat and/or exposed to light with an appropriate wavelength, so as to allow the at least one monomer and the crosslinking agent to complete polymerization and crosslinking reaction, whereby the HIPE is cured into a monolith. The dispersed phase and unreacted reagents are removed afterwards from the monolith by, for example, Soxhlet extraction with iso-propanol, methanol, ethanol, tetrahydrofuran, acetone or methyl ethyl ketone. The monolith may be dried directly, preferably dried under vacuum, to thereby facilitate rupturing the droplets of the dispersed phase to generate the connecting pores. In the case where the porous monolith herein is prepared from a HIPE, the size and uniformity of the macropores in the monolith can be adjusted by changing the agitation speed and/or the agitation temperature during the preparation of the HIPE, whereas the size of the connecting pores and, therefore, the minimum diameter of the porous network formed in the monolith, can be modified by altering the volume ratio of the dispersed phase to the continuous phase in the HIPE.

In another preferred embodiment, Step A is carried out using colloidal crystal templating, which includes self-assembling mono-sized polymeric nanospheres to create a template with a three-dimensional ordered microstructure, followed by infiltrating a monomer-containing composition into void spaces of the template and then polymerizing the monomers into a monolith, and finally by removing the template from the monolith via Soxhlet extraction or supercritical fluid extraction. The monomer-containing composition herein may have the same contents as described above for the continuous phase composition. Feasible protocols for colloidal crystal templating can be seen in, for example, U.S. Pat. Nos. 6,414,043 and 11,118,024.

The porous monolith prepared by colloidal crystal templating has an advantageous feature of possessing a highly regular porous structure with uniform macropores distributed in a close-packing arrangement, where each macropore is interconnected to adjacent macropores via twelve connecting pores. Preferably, at least 70% of the macropores, more preferably at least 80% of the macropores, and most preferably at least 90% of the macropores, such at least 95% of the macropores, in the porous monolith are in a close-packing arrangement. Examples of the close-packing arrangement include a hexagonal closest packing (hcp) arrangement, a face centered cubic packing (fcc) arrangement, or a combined arrangement thereof. As disclosed in U.S. Pat. No. 11,118,024, the size of the macropores in the monolith is tunable by altering the size of the polymeric nanospheres used to create the template, whereas the size of the connecting pores and, therefore, the minimum diameter of the porous network formed in the monolith, can be enlarged through a controlled deformation of the orderly arranged nanospheres to increase the contact therebetween.

The porous monolith obtained in Step A has a shape in conformity with the shape of the reaction vessel where polymerization takes place. Typically, the porous monolith is in form of a polymer block having a size of equal to or less than 200 cm³ in volume. In Step B, the porous monolith is subjected to mechanical griding, such that it is crushed and ground into a first population of porous particles having a size distribution of below 1,000 μm, which means herein that at least 50%, preferably at least 70%, more preferably at least 80%, such as at least 90%, of the particles have a Feret diameter of less than 1,000 μm. The term "mechanical grinding" as used herein may refer to the use of friction, collision, impingement, shear or other mechanical actions to reduce the size of solids. The mechanical grinding is usually carried out by high-energy milling in a conventional milling device, such as in a disk mill, a ball mill, a rotary knife mill, a two-roll mill, a granulator, a turbo mill and combinations thereof. The first population of porous particles are imparted with irregular configurations and rough outer surfaces during the mechanical grinding.

In Step C, the first population of porous particles obtained in Step B are separated according to size, thereby isolating a second population of porous particles with a Feret diameter ranging from 25 µm to 500 µm, which means herein that at least 70%, preferably at least 80%, more preferably at least 90%, such as at least 95%, of the particles isolated have a Feret diameter of 25-500 µm. In a preferred embodiment, the first population of porous particles are sieved through a series of Taylor screens, and the particles within desired size ranges, such as those within the ranges of <25 µm, 25-75 µm, 75-150 µm and 150-500 µm, are collected. In a more preferred embodiment, the sieving is performed in a vibratory sieve machine, where at least three layers of mesh screens are mounted one above another in a vertical arrangement, with each screen having larger openings than the one below. The first population of porous particles may be fed to the vibratory sieve machine from the top, and the second population of porous particles with a desired size distribution may be harvested from one of the layered screens after sieving. In some instances, grinding balls made of rigid material, such as zirconia and glass, may be added to the respective screens, as a means to increase production yield by breaking down the porous particles to finer sizes. Statistically, the second population of porous particles have a Feret aspect ratio distribution between 1.0 and 3.5 with a standard deviation ranging from 1.2 to 2.2 as determined by particle image analysis under electron microscopy.

The following examples are given for the purpose of illustration only and are not intended to limit the scope of the invention.

Example 1: Preparation of Porous Monolith

Glycerol monomethacrylate (GMA; Sigma-Aldrich Corporation, USA), divinylbenzene (DVB; Sigma-Aldrich Corporation, USA) and lauroyl peroxide (LPO; Sigma-Aldrich Corporation, USA) were mixed in a ratio of 50:25:2 (w/w/w) to prepare a continuous phase composition, to which Pluronic® L-121 was added to 6 weight percent based on the total weight of the continuous phase composition. An aqueous discontinuous phase composition which contains $CaCl_2$) and tetramethylethylenediamine (TMEDA; Sigma-Aldrich Corporation, USA) dissolved in double distilled water in a ratio of about 11:2:1100 (w/w/w) was then added to the continuous phase composition in a ratio of 3:1 (v/v), and a water-in-oil emulsion was prepared by vigorous stirring for about 5 minutes using a high-speed homogenizer (model T25; IKA, Germany). The emulsion was placed in an oven (model DENG YNG DO60). The temperature was gradually increased from room temperature to 80° C. within 4 hours and kept at 80° C. for 24 hours to allow polymerization to take place, whereby the emulsion was cured into a monolith. The monolith was washed using Soxhlet extraction with isopropanol to remove water and unreacted reagents. The porous monolith was then dried under vacuum to obtain dried porous monolith. The minimum diameter of the porous network of the monolith was measured by capillary flow porometry (PMI Porous Materials Inc., CFP-1100AE).

Example 2: Preparation of Porous Particles from Monolith

Figure 4A:
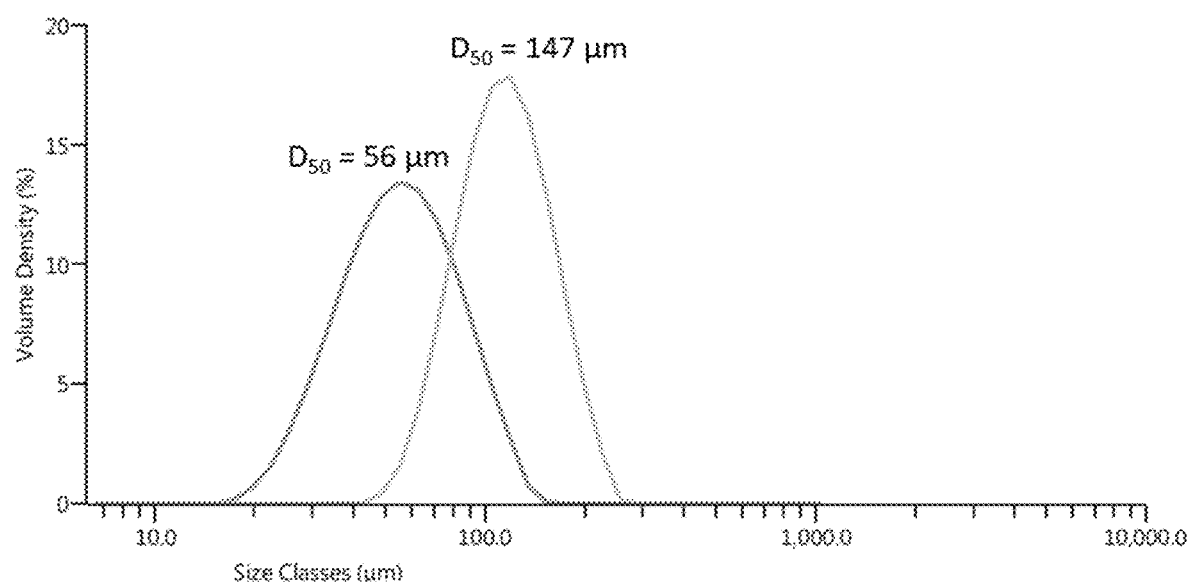
FIG. 4A shows the size distributions of two populations of particles after sieving.
Figure 4B:
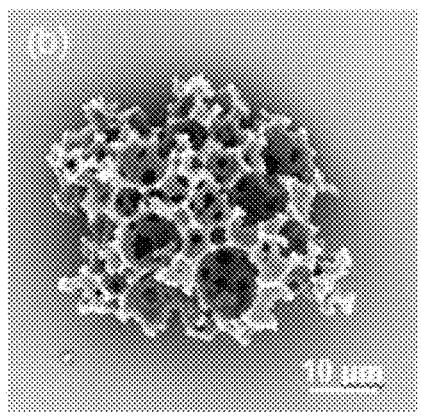
FIGS. 4B-4F are scanning electron microscopic images of the porous particles according to one embodiment of the invention.
Figure 4C:
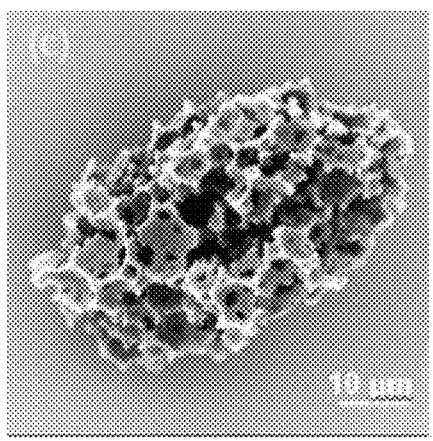
Figure 4D:
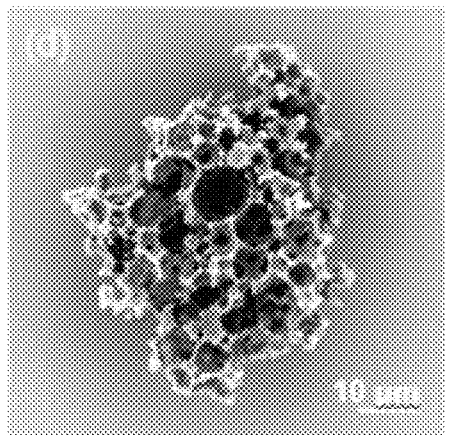
Figure 4E:
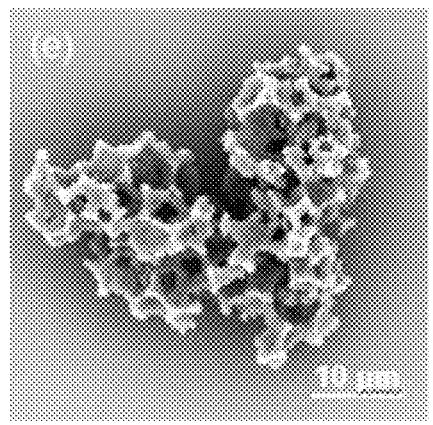
Figure 4F:
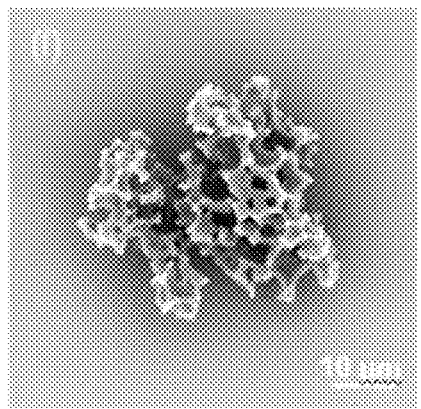
Figure 5:
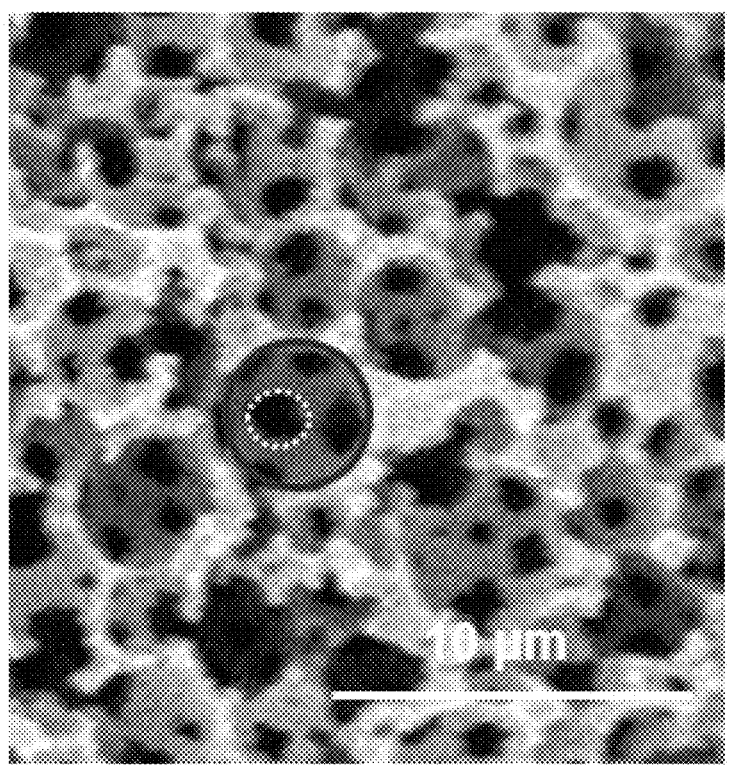
FIG. 5 is a scanning electron microscopic image showing the interior of a porous particle according to one embodiment of the invention.

The porous monolith obtained in Example 1 was ground in a stainless steel grinder (Feli Technology Co., Ltd., Model NBM-200, Taiwan), so as to harvest a first population of porous particles with a particle size distribution of below 1,000 µm. The porous particles were then sieved in a vibratory sieve shaker (FRITSCH GmbH, Model Analysette 3 Pro, Bahnhofstrasse, Germany) equipped with stacked perforated plate sieves, and the particles with a diameter ranging from 25-100 microns were isolated as a second population of porous particles. According to the embodiment shown in FIG. 4A, the second population of porous particles has a normally distributed particle size distribution with a median diameter (D50) of 56 µm. Images of the porous particles were taken by scanning electron microscopy (Thermo Fisher Scientific Inc., Phenom Pro), and some of them are shown in FIGS. 4B-4F. Forty-five particle SEM images were randomly selected for calculation of particle irregularity, and the second population of porous particles were shown to have a Feret aspect ratio of 1.75±0.59.

Example 3: Pore Characterization of Porous Particles

Figure 8:
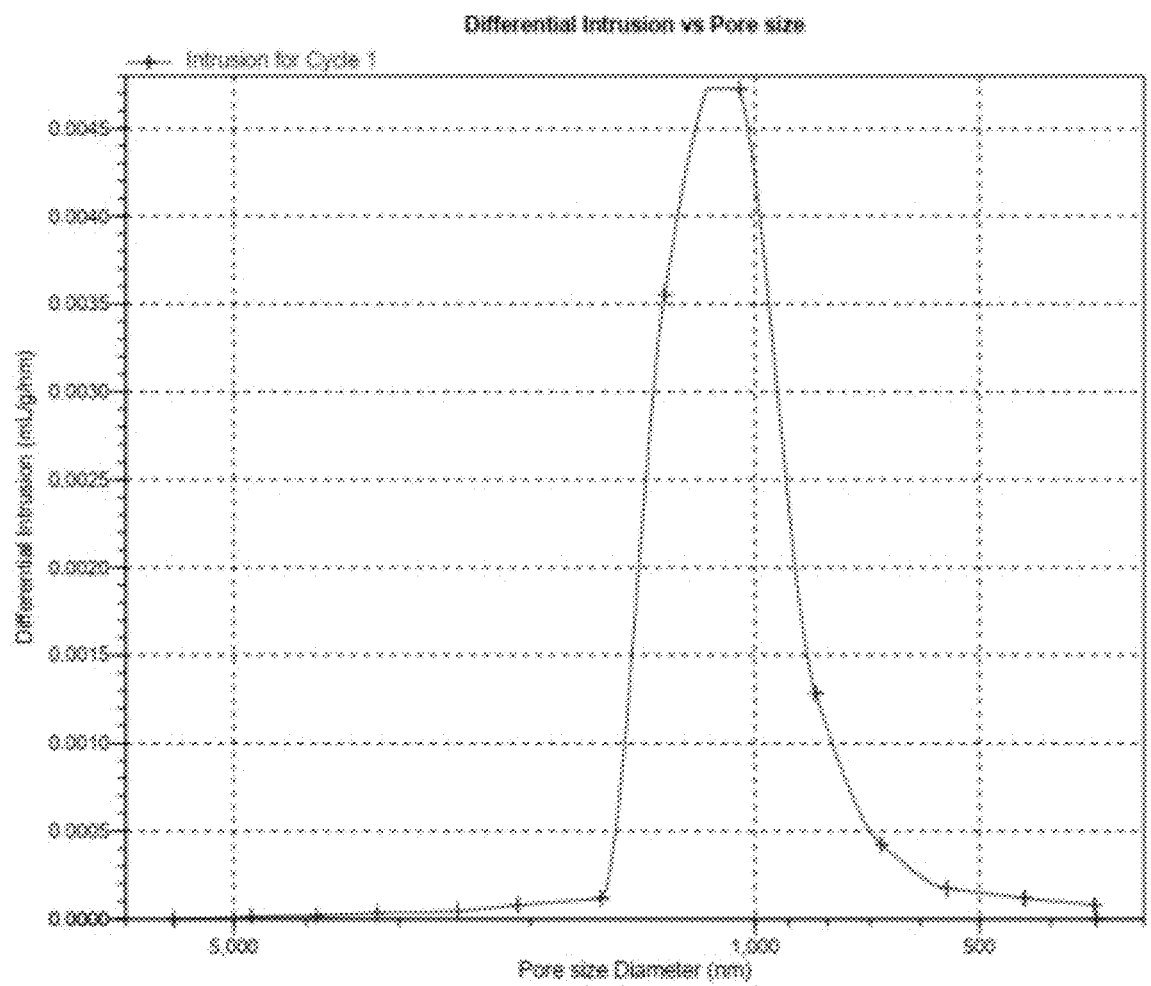
FIG. 8 is a graph showing a pore-size distribution curve of the porous particles as measured by mercury intrusion porosimetry.

The pore-size distribution curve of the porous particles obtained in Example 2 was measured by mercury intrusion porosimetry according to ASTM D-4284 standard (2003). As shown in FIG. 8, the porous networks formed within the porous particles have an average diameter of 1.26 µm. It can be further seen from FIG. 8 that more than 90% of the porous networks are in the range of 500-2,000 nm, with very few of them having a diameter less than 500 nm. These results indicate that the porous particles herein are substantially free of diffusive pores with a diameter less than 100 nm, and that the porous networks formed within the particles are sufficiently large to allow convective mass transfer through the particles.

Example 4: Surface Modification of Porous Particles

The porous particles obtained in Example 2 were added into a 1% solution of tetraethyl pentamine in water and heated at 70° C. for at least 5 hours. The porous particles were filtered out and added into a 1% solution of glycidyltrimethylammonium chloride in water and heated at 70° C. for at least 5 hours. The porous particles were washed with water to obtain a strong anion exchanger which is referred to hereafter as DuloCore™ QA.

1 mL of the strong anion exchanger DuloCore™ QA was packed into a polypropylene chromatographic column with an internal diameter of 7.4 mm.

Example 5: Dynamic Binding Capacity

The chromatographic column prepared in Example 4 was tested for dynamic binding capacity to bovine serum albumin (BSA), and the results were compared with those obtained using two commercialized anion exchange columns, in which Capto™ Q (purchased from GE Healthcare Life Science, U.S.A.) includes a dextran matrix with a particle size of 90 µm and diffusive micropores of 50 nm, and CIMmultus™ QA (purchased from BIA Separations) is a poly(methyl methacrylate)-based monolith column with a pore size of 2 µm. The mobile phase used herein is 50 mM Tris-HCl, pH 8.5, with 1 mg/mL BSA being applied to the mobile phase as an analyte. DBC was detected by an ÄKTA™ Pure chromatography system (Cytiva Sweden AB, Uppsala, Sweden). The results are shown in FIG. 9.

Figure 9:
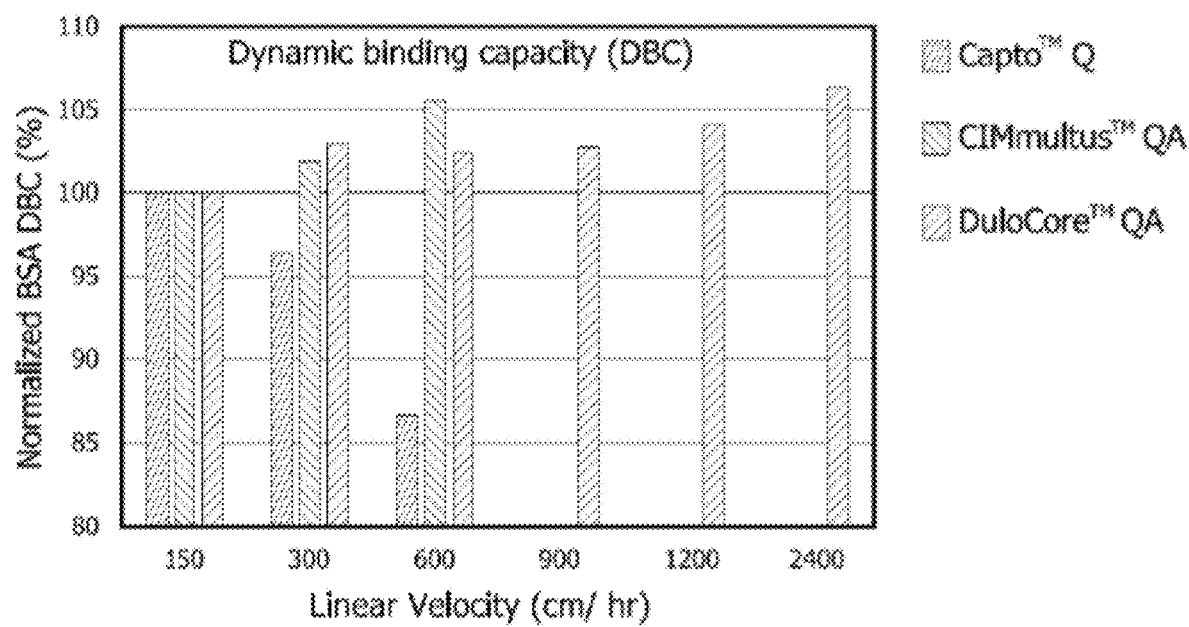
FIG. 9 is a histogram comparing the dynamic binding capacity of the chromatographic column according to one embodiment of the invention and two conventional ion exchange columns.
Figure 10A:
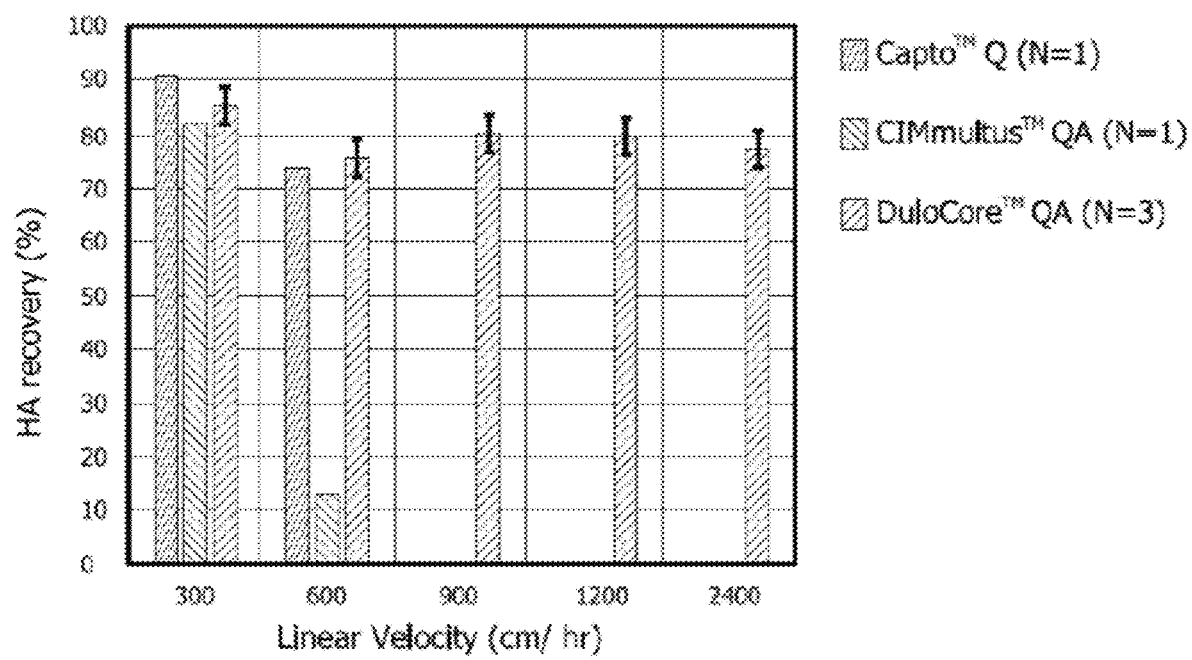
FIG. 10A is a histogram comparing the haemagglutinin (HA) recovery of the chromatographic column according to one embodiment of the invention and two conventional ion exchange columns.
Figure 10B:
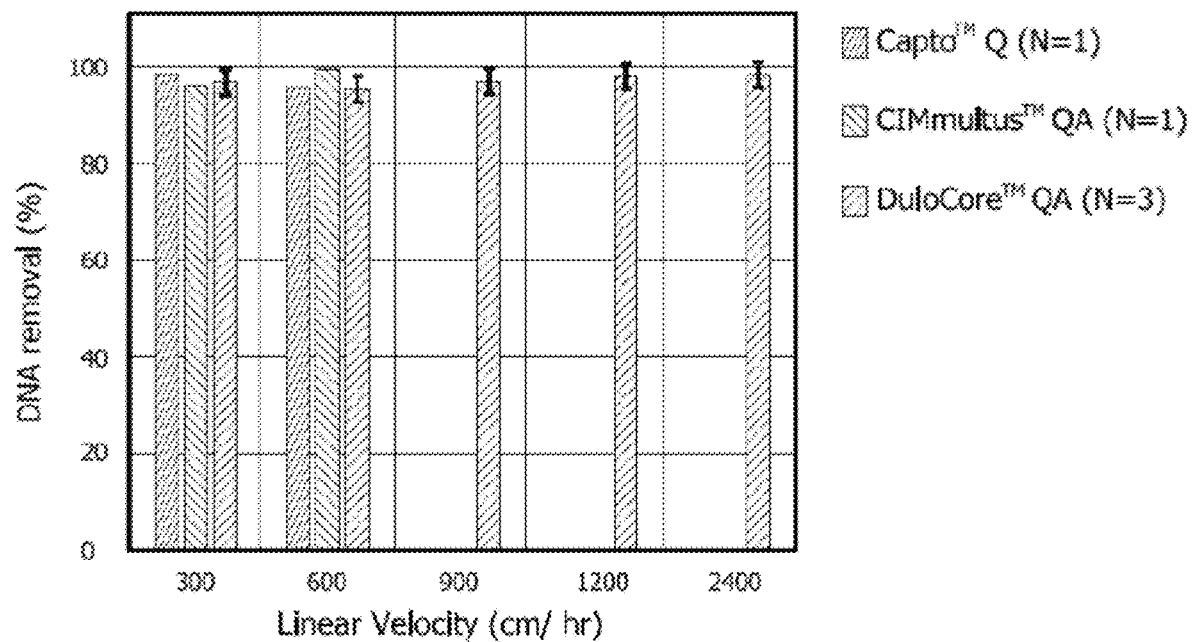
FIG. 10B is a histogram comparing the DNA removal ability of the chromatographic column according to one embodiment of the invention and two conventional ion exchange columns.

As shown in FIG. 9, for Capto™ Q column, the DBC decreases significantly as the flow rate of the mobile phase increases, indicating that the dextran particles packed in the column are less competent to adsorb macromolecules from the mobile phase as the flow rate increases. This appears due to the fact that the intraparticle mass transport in the conventional column is achieved by diffusion alone and the efficiency of diffusion decreases with increase of the flow rate. For CIMmultus™ QA, the DBC value increases slightly as the flow rate increases, while a flow rate above 600 cm/hr is not recommended by the manufacturer. As for the chromatographic column of Example 4, the porous particles packed therein show consistent ability of adsorbing BSA molecules from the mobile phase, even at an extremely high flow rate such as 2400 cm/hr. That is to say, the adsorption of BSA molecules on the porous particles herein is independent of the flow rate of the mobile phase, indicating that BSA molecules are convectively transported within the porous particles. This result also shows that intraparticle transport of BSA in the packed chromatographic column herein is governed exclusively by convection, suggesting that the porous particles according to the invention, as well as the porous networks formed therein, are substantially free of diffusive pores, that is, substantially free of micropores with diameters less than 100 nm.

Example 6: Virus Purification

In this example, the ion exchange chromatographic column prepared in Example 4 was tested alongside with the conventional counterparts, Capto™ Q and CIMmultus™ QA for their ability to harvest an avian-origin human-infecting influenza (H7N9) virus, according to the process proposed in Tseng Y. F. et al., *Vaccine* 36 (2018), p.3146-3152. Virus samples were loaded into the respective columns with the flow rates indicated in FIGS. 10A-10B. The flow-through fractions were collected for measuring virus recovery, while host cellular DNAs were adsorbed in the columns.

As shown in FIG. 10A, the virus recovery efficiency of CIMmultus™ QA column decreases drastically as the flow rate increases. On the other hand, the recovery rate of DuloCore™ QA column remained above >75% throughout the tested flow rate range. As further shown in FIG. 10B, DuloCore™ QA column exhibited a nearly constant DNA removal rate which remained high even when the flow rate was increased up to 2400 cm/hr, in contrast to Capto™ Q and CIMmultus™ QA columns, both of which are not recommended to be used at a flow rate over 600 cm/hr.

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the spirit and scope of the invention.

What is claimed is:

1. A stationary phase medium for adsorption chromatography comprising:

a plurality of porous particles made of cross-linked polymeric material with a Feret diameter ranging from 25 μm to 500 μm and having a porosity ranging from 70% to 90%, each being formed with multiple spherical macropores having a diameter ranging from 3 μm to 10 μm, wherein the spherical macropores are interconnected with one another via connecting pores to constitute a porous network with an average diameter ranging from 0.2 μm to 6 μm; and wherein the porous particles are in form of irregular granules having a Feret aspect ratio distribution between 1.0 and 3.5 with a standard deviation ranging from 1.2 to 2.2.

2. The stationary phase medium of claim 1, wherein the porous particles are substantially free of micropores with a diameter less than 100 nm, as measured by mercury intrusion porosimetry.

3. The stationary phase medium of claim 2, wherein the porous network has an average diameter ranging from 0.5 μm to 3.0 μm.

4. The stationary phase medium of claim 3, wherein the porous network has an average diameter ranging from 1.2 μm to 2.4 μm.

5. The stationary phase medium of claim 2, wherein the stationary phase medium is surface modified with ion exchange functionality.

6. The stationary phase medium of claim 5, wherein the ion exchange functionality is selected from the group consisting of a quaternary amine, diethylaminoethyl, sulfonyl and carboxymethyl.

7. The stationary phase medium of claim 6, wherein the cross-liked polymeric material is selected from the group consisting of polyacrylates, polymethacrylates, polyacrylamides, polystyrenes, polypyrroles, polyethylenes, polypropylenes, polyvinyl chloride and silicones.

8. The stationary phase medium of claim 7, wherein the cross-liked polymeric material is selected from polymethacrylates.

9. The stationary phase medium of claim 2, wherein at least 70% of the spherical macropores in the respective porous particles are in a close-packing arrangement.

10. The stationary phase medium of claim 1, which is produced by a method comprising the steps of:

A. preparing a porous monolith of cross-linked polymeric material having a porosity ranging from 70% to 90%, wherein the porous monolith is formed with multiple spherical macropores having a diameter ranging from 3 μm to 10 μm, and the spherical macropores are interconnected with one another via connecting pores to constitute a porous network with an average diameter ranging from 0.2 μm to 6 μm;

B. subjecting the porous monolith to mechanical grinding, such that the porous monolith is ground into a first population of porous particles having a particle size distribution of below 1,000 μm; and C. size-sorting the first population of porous particles to obtain a second population of porous particles as the stationary phase medium.

11. A chromatographic column, comprising a hollow elongated tube packed with the stationary phase medium of claim 1.

12. A method for producing the stationary phase medium of claim 1 comprising the steps of:

A. preparing a porous monolith of cross-linked polymeric material having a porosity ranging from 70% to 90%, wherein the porous monolith is formed with multiple spherical macropores having a diameter ranging from 3 μm to 10 μm, and the spherical macropores are interconnected with one another via connecting pores to constitute a porous network with an average diameter ranging from 0.2 μm to 6 μm;

B. subjecting the porous monolith to mechanical grinding, such that the porous monolith is ground into a first population of porous particles having a particle size distribution of below 1,000 μm; and C. size-sorting the first population of porous particles to obtain a second population of porous particles with a Feret diameter ranging from 25 μm to 500 μm, wherein the second population of porous particles are in form of irregular granules having a Feret aspect ratio distribution between 1.0 and 3.5 with a standard deviation ranging from 1.2 to 2.2.

13. The method of claim 12, wherein the step C of size-sorting comprises sieving the first population of porous particles through a series of Taylor screens.

14. The method of claim 13, wherein the step A comprises preparing the porous monolith by a process selected from the group consisting of high internal phase emulsion templating and colloidal crystal templating.

15. A method for producing the stationary phase medium of claim 1 comprising the steps of:

A. preparing a porous monolith of cross-linked polymeric material having a porosity ranging from 70% to 90% by a process selected from the group consisting of high internal phase emulsion templating and colloidal crystal templating, wherein the porous monolith is formed with multiple spherical macropores having a diameter ranging from 3 μm to 10 μm, and the spherical macropores are interconnected with one another via connecting pores to constitute a porous network with an average diameter ranging from 0.2 μm to 6 μm;

B. subjecting the porous monolith to mechanical grinding, such that the porous monolith is ground into a first population of porous particles having a particle size distribution of below 1,000 μm; and C. size-sorting the first population of porous particles by sieving to obtain a second population of porous particles with a Feret diameter ranging from 25 μm to 500 μm, wherein the second population of porous particles are in form of irregular granules having a Feret aspect ratio distribution between 1.0 and 3.5 with a standard deviation ranging from 1.2 to 2.2.

* * * * *